UNITED STATES PATENT OFFICE.

JOSEPH HAY AMIES, OF PHILADELPHIA, PENNSYLVANIA.

ALKALINE CEMENT.

1,088,646.  Specification of Letters Patent.  Patented Feb. 24, 1914.

No Drawing.  Application filed May 21, 1913.  Serial No. 769,005.

*To all whom it may concern:*

Be it known that I, JOSEPH HAY AMIES, a citizen of the United States, residing at Philadelphia, in the county of Philadelphia and State of Pennsylvania, have invented a certain new and useful Alkaline Cement, of which the following is a specification.

This invention relates to a cement which may be utilized for various purposes and has for its principal object to provide, as a new and complete article of manufacture, a composition which may be manufactured at one place, sold and shipped in suitable receptacles to other places, for mixture thereat with natural soil (common earth), as it is generally found, in contradistinction from clean sharp sand, gravel or broken stone.

A further object, of the present invention, is to provide, as a new and complete article of manufacture, a cement or dry powdery form, which may be shipped in bags or sacks, said cement being composed of Portland cement, calcium hydroxid and plaster of Paris, so proportioned as to readily set natural soil (common soil), in any condition in which it may be found.

With these and other objects in view, the invention consists of the improvements hereinafter described and finally claimed.

As is commonly known, sand, pebbles and broken stone each contain considerable percentages of silica, while natural soil, that is, common earth, in contradistinction thereto, contains practically little or no silica. In view of these facts, it is comparatively easy to take clean sharp sand, gravel or broken stone and mix therewith Portland cement and effect a set thereof, but on the other hand, it has heretofore been possible to take natural soil or sub-soil and mix therewith Portland cement and secure a set of said soil. By natural soil, as set forth in the present application, is meant loam, clay, unclean sand and the like. Such soil invariably contains more or less humus material as decayed vegetation and other foreign substances. The cement of the present invention is calculated when mixed with natural soil to neutralize the humus acid contained in such foreign substances and efficiently and permanently harden such natural soil for various utilities.

In practising the invention, I manufacture, for instance, at a central plant, the cement of the invention, employing Portland cement, calcium hydroxid and plaster of Paris, all in dry powdery form which ingredients for all general purposes are compounded in the following proportions, to wit: about 50 parts Portland cement, about 30 parts calcium hydroxid, and about 20 parts plaster of Paris. The cement thus compounded is a new article of manufacture, is a complete product in itself and is of dry powdery form. This cement is shipped, for instance, from a central plant in suitable receptacles or containers, usually bags or sacks to various sections of the country. The purchaser of such cement takes natural soil or sub-soil (common earth), in any condition in which it may be found and preferably places it in any standard mixing machine, capable of reducing to an impalpable condition, all the soft particles such as lumps of clay and loam, without crushing the gravel and pebbles, which may be associated therewith. It is necessary to reduce the loam and clay lumps to an impalpable condition in order that the alkaline cement of the invention which is to be added to said natural soil may be intimately mixed therewith. The alkaline cement of the invention in proper quantities and in the same condition as received by the purchaser, is then placed in the mixing machine with the natural soil and thoroughly mixed therewith in a dry state, a solvent as plain water in sufficient quantities being placed within the mixing machine to render the mixture suitable for forming the utilities desired.

The above described alkaline cement possesses considerable commercial value and mention may be here made of certain of its prominent advantages:—The cement comprises a novel combination of ingredients which may be easily and cheaply manufactured as a complete article of commerce and shipped from a central plant for use by unskilled labor at the farm or other remote place where stone is scarce and costly, utilizing natural soil for mixture with said cement with which to construct general utilities. A further advantage of the cement resides in the fact that it makes possible the utilization for commercial purposes of loam, clay, unclean sand and the like which heretofore have been unheard of as material which could be effectively hardened for various utilities. The extreme cheapness with which the cement of the invention may be manufactured and sold and the comparatively little or no cost attached to natural soil, make it possible to now form cementitious utilities far below the cost of utilities manufactured from cements upon the market at the present time. For instance, standard Portland cement weighs 95 pounds to the cubic foot. The ingredients I incorporate with Portland cement according to the present invention, weigh 40 pounds to the cubic foot. Besides weighing less than Portland cement, my cement is also cheaper, so that, bulk for bulk, my ingredients will cost less both in freight transit and actual cost.

What I claim is:

1. As a new article of manufacture, the herein described dry powdery cementitious composition composed of about 50 parts Portland cement, about 30 parts calcium hydroxid and about 20 parts of plaster of Paris.

2. As a new and complete article of manufacture, a dry powdery cementitious composition of the class described composed of Portland cement, calcium hydroxid and plaster of Paris said ingredients being suitably proportioned to secure the set of natural soil when such soil combined with water is mixed therewith.

In testimony whereof, I have hereunto signed my name.

JOSEPH HAY AMIES.

Witnesses:
WILLIAM J. JACKSON,
AGNES E. CASKEY.

Copies of this patent may be obtained for five cents each, by addressing the "Commissioner of Patents, Washington, D. C."